Aug. 31, 1943.   R. G. DREW   2,328,066
COATING HYDROPHILIC CELLULOSIC FILMS
Filed May 3, 1940
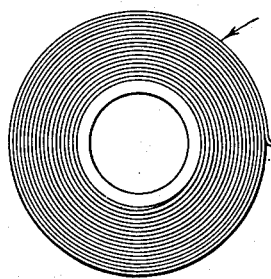
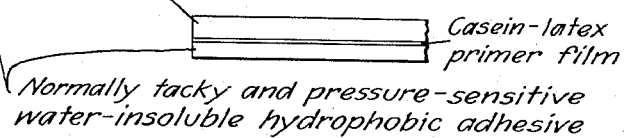
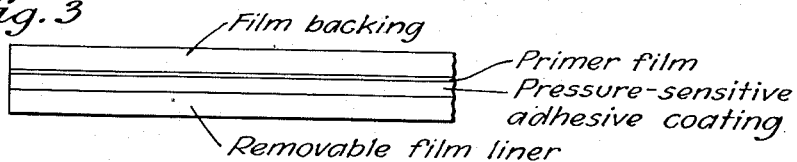
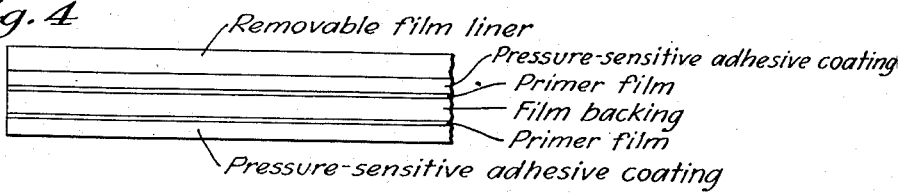
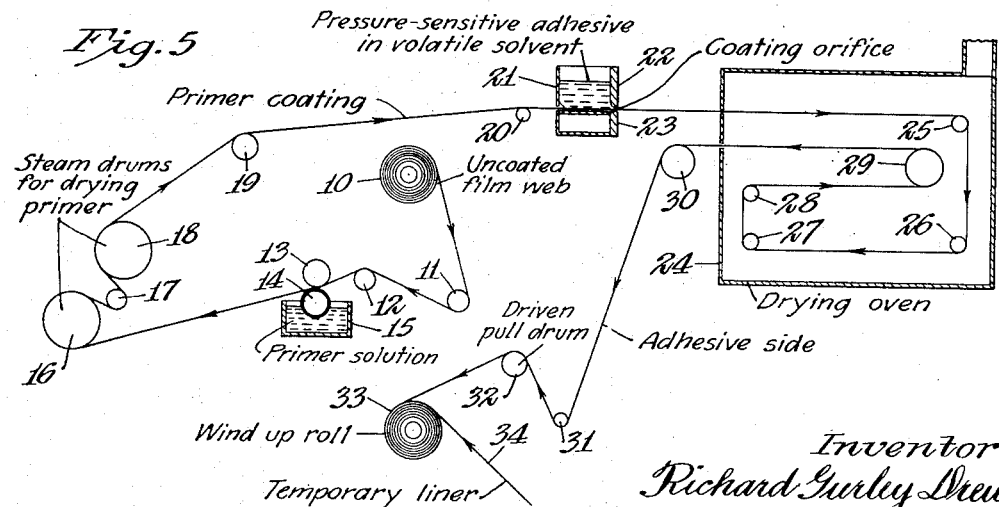
Inventor
Richard Gurley Drew
By Paul Carpenter
Attorney Patented Aug. 31, 1943

2,328,066

UNITED STATES PATENT OFFICE 2,328,066

COATING HYDROPHILIC CELLULOSIC FILMS

Richard Gurley Drew, St. Paul, Minn., assignor to Minnesota Mining & Manufacturing Company, St. Paul, Minn., a corporation of Delaware Application May 3, 1940, Serial No. 333,136

17 Claims. (Cl. 117—80)

This invention relates to the provision of tightly bound coatings or films upon non-fibrous hydrophilic cellulosic films having smooth, dense, non-porous surfaces; and particularly aims at providing a primer coating for bonding water-insoluble hydrophobic coatings or layers to such cellulosic films to secure a firmness of bonding much greater than would result if the primer coating were omitted. An important application of the invention is in making pressure-sensitive adhesive sheeting of the type having a non-fibrous cellulosic film backing coated on one or both sides with a water-insoluble pressure-sensitive adhesive coating (exemplified by normally tacky rubber-resin coatings). This application is a continuation-in-part of my copending application Serial No. 675,291, filed June 10, 1933.

Regenerated cellulose films (as "Cellophane") are non-fibrous hydrophilic cellulosic films having smooth, dense, non-porous surfaces with which I am especially concerned; but the invention is not limited to films of cellulose. Various cellulose ethers, for example, are known which are hydrophilic, including hydroxy alkyl cellulose ethers, methyl cellulose, and special hydrophilic types of ethyl cellulose. These are to be contrasted with the cellulose nitrate, cellulose acetate, and high-ethoxy ethyl cellulose films of commerce, which are hydrophobic.

A serious and difficult problem is involved in attempting to bond water-insoluble hydrophobic coatings to non-fibrous hydrophilic cellulosic films having smooth, dense, non-porous surfaces. In the first place, the two types of materials necessarily have a low affinity. Such cellulosic films contain adsorbed moisture and, in the case of regenerated cellulose films, for example, commonly include a hygroscopic water-soluble softening agent, such as glycerine, which is not compatible with water-insoluble hydrophobic coatings. In the second place, the smooth, dense, non-porous surface of the cellulosic film provides no opportunity for penetration of the hydrophobic coating and hence the absence of mechanical interlocking makes bonding dependent upon chemical affinity which, as has been pointed out, is low in this case. Thus the problem is quite different from that in the art of coating fibrous cellulose fabrics (such as papers, felts and cloths) wherein a fibrous and porous surface permits of the penetration and mechanical interlocking of an applied coating.

In the case of normally tacky and pressure-sensitive adhesive coatings of the rubber-resin type, which are water-insoluble and hydrophobic, the "non-drying" adhesive adheres to a regenerated cellulose film with substantially the same strength as it adheres to other surfaces toward which it has no special chemical affinity—such as glass surfaces. Adhesive tapes of this kind, having a non-fibrous regenerated cellulose film backing, may be successfully unwound from rolls thereof, or stripped from smooth surfaces to which temporarily applied, without delamination of the adhesive coating from its backing. This success is due in large part to a special phenomenon, namely, that the mechanical forces involved during unwinding or stripping are such as to favor retention of the adhesive upon the surface which is being stripped away. If a cellulose film adhesive tape is wound in a roll with the adhesive on the outer side of the backing—contrary to the usual practice—unwinding will tend to pull adhesive from its backing, the adhesive adhering to the back or inner surface of the contacting cellulose backing which is being stripped away. Likewise, if a cellulose film liner be applied to the adhesive surface of cellulose film pressure-sensitive tape, subsequent stripping away of the liner will tend to pull the adhesive off from its backing. Moreover, if cellulose film pressure-sensitive tape be applied to a surface toward which the adhesive has a marked affinity, stripping off of the tape, particularly if great care is not used, will result in offsetting of adhesive from the tape backing, the mechanical forces which favor retention upon the backing not overcoming the preferential adhesion of the adhesive for the contacting surface from which removal is sought. In order to provide strong bonding of the pressure-sensitive adhesive coating to the cellulose film backing, the use of an interposed primer coating is indicated. The primer must bond both to the smooth, dense and non-porous surface of the hydrophilic cellulose film, and to the under surface of the hydrophobic adhesive surface, with a strength substantially greater than that of the bond resulting when the adhesive is applied directly to the cellulose film surface. That is, the primer must bond strongly to each of two quite different types of surfaces. Heretofore no primer has been known which would greatly increase the bonding strength of rubber-resin pressure-sensitive adhesive coatings to non-fibrous hydrophilic cellulosic films. An object of the present invention is to provide a way of priming non-fibrous hydrophilic cellulosic films having smooth, dense, non-porous surfaces, so that rubber-resin pressure-sensitive adhesive coatings can be thereby bonded to the backing at least about twice as firmly as would be the case if no primer were used, so as to provide a product in which the adhesive coating is non-offsetting under severe or unusual conditions of use.

The invention is not limited to products wherein a pressure-sensitive adhesive coating is employed, since the invention is of broad application in bonding a wide variety of water-insoluble hydrophobic coatings to non-fibrous hydrophilic cellulosic films. Also, non-fibrous hydrophilic cellulosic films coated on one or both sides with the bonding coating have utility per se and are embraced within the invention.

The bonding coating of the present invention is formed by applying to the hydrophilic cellulosic surface an aqueous latex emulsion containing a substantial proportion of a hydrophilic colloidal agglutinant which adheres strongly to the cellulosic surface, and drying to form a dried film firmly bonded to the cellulosic surface. Such hydrophilic colloidal material is absorbed on the surfaces of the hydrophobic colloidal latex particles and makes for stabilization both in the coating composition before application and during drying of the coating, which is an incidental feature of definite value. Suitable agglutinants for this purpose are protein glues, exemplified by casein, hide and bone glue, isinglass (fish glue), gelatine, soy bean protein glues, and "Mazein" ("prolamine" found in corn and extracted from corn gluten meal and purified). Casein is preferred. The invention is not limited to protein agglutinants. Water-soluble gums may be used which are of a type that can be employed in substantial amount without producing undue thickening of the primer solution, or can be employed in conjunction with a protein agglutinant. A preferred carbohydrate hydrophilic colloidal agglutinant is dextrin. In general, the useful range of colloidal agglutinant, for present purposes, is 15 to 600 parts by weight per 100 parts of latex rubber solids.

The latex emulsion may be a concentrated latex milk containing uncured latex rubber; but use may be made of vulcanized latex milk, such as is exemplified by "Vultex" (latex milk vulcanized by a special process which avoids coagulation). Use may also be made of equivalent artificial aqueous dispersions of rubber or of artificial or synthetic rubber-like materials, which will be understood as embraced within the scope of the invention.

*Example*

| | Parts by weight |
|---|---|
| Casein | 30 |
| Rubber latex (60% rubber) | 96 |
| Ammonium hydroxide (28% $NH_3$) | 13 |
| Beta-naphthol | 1.5 |
| Water | 275 |

The casein is soaked in the water for half an hour at 100° F., the ammonium hydroxide is added, the temperature is raised to 125° F., and the batch mixed until the casein is thoroughly dissolved. The beta-naphthol is then added, the latex mixed in, and the batch stirred for about 15 minutes to secure a uniform dispersion of casein and latex solids in the aqueous vehicle. The resultant mixture is then ready for use in coating the cellulosic film as hereinafter described.

The proportions may be varied over a considerable range. Thus the proportion of casein may be varied within a fairly wide range to obtain primer coatings which will bond rubber-resin pressure-sensitive adhesive coatings to hydrophilic cellulosic films with markedly greater strength than would be the case if no primer were used. A range of 15 to 600 parts by weight of casein per 100 parts of latex rubber (dry solids basis) has been found of utility. In the example, the proportion is approximately 50 parts casein per 100 parts rubber solids. It will be recognized that the proportion of casein is of a higher order than that employed in general latex compounding and stabilizing, the proportion customarily used for such purposes being of the order of 1 to 4 parts per 100 parts rubber solids.

The ammonium hydroxide serves as an alkaline agent to disperse the casein and, being volatile, will be driven off during drying of the applied coating. The beta-naphthol serves both as a casein preservative and as an anti-oxidant for the rubber. Other rubber anti-oxidants may be used, as is well understood in the latex art.

Tanning of the protein in situ in the coating after application to the cellulosic film is advantageous in making for a tougher and more water and moisture resistant bonding coat, and one which provides a still stronger bond between the primer and a rubber-resin pressure-sensitive adhesive coating applied thereover. Using this expedient, pressure-sensitive adhesive tapes can be made which will better withstand highly humid atmospheres in that the tape can be unwound from rolls thereof and removed from surfaces with less tendency for adhesive transfer taking place.

One way to produce such tanning is to add formaldehyde solution to the ammoniacal casein-latex solution (illustrated by the foregoing example), or the like, in an amount to provide about 6 parts by weight of formaldehyde per 100 parts casein, which is sufficient to tan all of the casein, although less can be employed if only partial tanning is desired. The formaldehyde promptly reacts with the ammonia to form hexamethylenetetramine. Of course instead of doing this, hexamethylenetetramine may be directly added to the coating solution. Upon subsequent drying of the coating after application to the cellulosic film the hexamethylenetetramine will decompose to yield formaldehyde and the latter will then tan the casein (or other protein) in situ. Another expedient is to subject the coating, after drying, to the action of formaldehyde solution or gas, as by applying a formaldehyde solution to the coating, or dipping the entire coated cellulosic film in a formaldehyde bath, followed by drying before applying the adhesive or other coating.

A desirable feature of the aforesaid type of bonding or primer coating is that it can be used in making transparent composite sheets and that it can be made of a minute thickness which does not add appreciably to the thickness of the composite. It is flexible and yieldable, so that composite sheeting can be bent, creased and flexed without cracking or rupturing the primer film and bond and without material stiffening of the composite.

Thus in priming regenerated cellulose films in the making of pressure-sensitive adhesive tape, I have found that one pound of the primer solution set forth in the preceding example will satisfactorily coat 170 square yards of regenerated cellulose surface to yield a dried primer film weighing approximately 11 grains per square yard and having a thickness of approximately 0.15 mil. In general, a primer film thickness of less than 0.5 mil is desirable.

Careful microscopic study of properly prepared and stained sections of cellulose film coated with a film of casein-latex primer, indicates that the casein and rubber are substantially uniformly distributed throughout the thickness of the primer film, and does not indicate that the casein is selectively adsorbed at the interface so as to form an interposed casein film. The cellulose surface is contacted by a two-phase composition of matter; that is, is contacted both by casein particles and by rubber particles; exclusive of such other phases or particles that may be present. That the casein (or equivalent hydrophilic colloidal agglutinant) is responsible for securing the herein specified bonding effect, is shown by the fact that latex alone cannot be used to secure such bonding.

In general, any hydrophobic coating which is compatible with rubber may be applied upon the aforesaid type of primer coating and will be firmly bonded thereby to the hydrophilic cellulosic film surface. The hydrophobic coating composition may, depending upon its nature, be applied in one or more of such ways as: (a) In a volatile vehicle or solvent, which is evaporated off after coating; (b) by melting and spreading upon the primer; (c) by calendering or frictioning. Among examples of such coatings may be mentioned rubber-resin pressure-sensitive adhesives; rubber-resin non-tacky adhesives activatible by solvents or heat; rubber-wax and rubber-asphalt compositions adapted to form films; rubbery base compositions of various types, including straight rubber coatings; moistureproof coatings including one or more components compatible with rubber; various synthetic resin coatings compatible with rubber, such as isobutylene polymer resins and blends thereof with other resins or with rubber.

The accompanying drawing illustrates various aspects of the invention in diagrammatic fashion as follows:

Figure 1 shows a roll of pressure-sensitive adhesive tape, and Figure 2 shows a schematic enlarged edge view of the tape, wherein a non-fibrous hydrophilic cellulosic film backing (such as regenerated cellulose film) is coated on one side with a casein-latex primer upon which there is a coating of a normally tacky and pressure-sensitive water-insoluble hydrophobic adhesive (such as a pressure-sensitive adhesive of the rubber-resin type). The composite adhesive tape may be transparent, so that it may be applied to surfaces without concealing the coloring or markings thereof, in which case a transparent adhesive will be used. An adhesive containing coloring material may be used, which will be visible through the film backing and primer, to make a colored adhesive tape, the optical effect being such that the backing itself will appear colored.

Figure 3 shows a schematic edge view of an adhesive sheet or tape wherein the pressure-sensitive adhesive covers part or all of the area of the film backing, being bonded thereto by an interposed casein-latex primer or the like, characterized by a removable liner (such as Holland cloth or regenerated cellulose film) contacting and covering the adhesive surface. The liner may be grasped and be peeled or stripped off without danger of delamination of the adhesive from its backing, owing to the firm bonding produced by the primer, notwithstanding that the backing has a smooth, dense, non-porous surface.

Figure 4 shows a schematic edge view of a double-coated pressure-sensitive tape having a liner attached to one of the adhesive faces. The composite may be wound in roll form, and desired lengths of tape may be unwound from time to time and the liner stripped off for use of the double-coated tape. The cellulosic film backing in this form is coated on both faces with the primer and a pressure-sensitive adhesive coating is applied to each side. Such double-coated tape has utility for many purposes; as for binding two surfaces together, which may later be separated again without transfer of the adhesive from its backing. By using a transparent adhesive, a composite adhesive tape may be made which is transparent, and may be used as an "invisible" splice for transparent sheets, for example. In general, such tape may be used in place of rubber cement for many sealing and joining purposes, having the advantage that it may be applied more conveniently and without the user being bothered with solvent fumes, and separation can later be effected, when desired, without the adhesive remaining upon the surfaces to which the tape was applied. It will be evident that the powerful bonding of the pressure-sensitive adhesive to its backing, by virtue of the primer, makes possible the success of this type of adhesive sheeting.

Figure 5 shows in diagrammatic fashion an illustrative system for the continuous making of pressure-sensitive adhesive sheeting, involving the steps of coating a regenerated cellulose film web (for example) with the aqueous primer solution formula hereinbefore set out; flash-drying the primer coating in a manner which produces a flat, unwrinkled and unwarped sheet; applying a coating of adhesive solution (such as rubber-resin pressure-sensitive adhesive dissolved in a volatile hydrocarbon solvent) upon the primer surface; passing the web through a drying oven to evaporate the solvent; and winding up the resultant adhesive sheeting into a roll with a temporary liner wound in as a separator for the turns of the roll. This roll may then, when desired, be unwound by pulling out the liner, and the adhesive sheeting passed to a slitting machine for slitting into desired tape widths and winding into rolls of desired length for sale.

Referring now to Figure 5 for a more detailed description of the illustrative system, a web of regenerated cellulose film sheeting is drawn from supply roll 10 to and around idler roller 11 and thence over idler roller 12 and down between coating rollers 13 and 14, roller 14 being located below roller 13 and having a rubber surface. Roller 14 dips into a bath of the aqueous primer solution and transfers it to the lower face of the web. These rollers are tightly set so that only a thin coating of primer solution remains upon the web as it leaves; thus it has been found that a coating of 1 pound of the primer solution of the example per 170 square yards of web surface produces good results.

The web then passes to and around steam-heated drum 16, thence back to and around idler roller 17, and thence back to and around steam-heated drum 18, following which it moves for some distance through the air to the adhesive coater, to permit of cooling, being supported and guided by idler rollers 19 and 20. The web contacts said steam-heated drums on its unprimed face, and is thereby quickly heated so as to cause flash-drying of the primer on the outer face. In a particular embodiment which I have employed, it has been found that heating of the drums to produce in operation a drum surface temperature of about 240° F. has given satisfactory results, the web contacting the drums for a total length of 36 inches, and a total period of 1½ to 3 seconds, depending upon the rate of travel of the web (which has been 20 to 40 yards per minute). The web is drawn through the mentioned equipment and is thus maintained under tension, and at the same time is held flat by the rollers and heating drums, and this with the flash-drying results in a primed web which is flat and unwrinkled and remains this way. If a regenerated cellulose film web were merely coated with the aqueous primer solution and dried without special measures being taken, it would buckle and curl and wrinkle to an extent making it unusable, and could not afterwards be flattened out successfully.

The primed web, having the primer upon the upper face, is then drawn through the adhesive coater 21; where its upper face is contacted by a viscid mass of pressure-sensitive rubber-resin adhesive dissolved in a volatile hydrocarbon solvent (for example) and the coated web is drawn out between doctor blades 22 and 23 to give a uniform coating of desired thickness. The coated web then passes into drying oven 24 for solvent removal, moving to the back of the oven and down over idler roller 25 to the lower part of the oven, thence around idler roller 26 to the front of the oven and up around idler roller 27 to idler roller 28, thence back toward the rear of the oven and around cold roll 29 and thence passes to the front of the oven and out, following which it passes down over cold roll 30. The adhesive face of the web contacts cold rolls 29 and 30 and is thus kept from becoming unduly soft from the heating.

After leaving the last-mentioned cold roll, the adhesive web, which bears a tacky and pressure-sensitive adhesive coating from which the solvent has been removed, passes down to and around idler roller 31 and thence up to and around driven pull drum 32, which is contacted by the tacky adhesive face of the web. It is this drum which pulls the web through the entire precedent equipment. The adhesive sheeting then moves to driven wind up roll 33, where a temporary liner 34 may be fed in to separate the turns if desired. The adhesive sheeting may thereafter be prepared for sale in tape rolls, by slitting and rewinding.

It will be obvious that when it is desired to prime the cellulosic film web on both faces, that this can be accomplished by using two priming units in series, for example, so that primer solution is applied to one face, dried, and then to the other face and that dried. Or if only one unit is available, the web can be primed on one face, wound up in a roll, and then sent through the unit again so as to prime the other face. The web, primed on both faces, can be double-coated with adhesive by being drawn through an adhesive bath and thence between a pair of doctor blades or a pair of squeeze rolls, which are spaced to give the desired coating thickness. If a double-coated tape having a liner is to be made, the double-coated web as it moves to the slitting means may be joined by a liner web moving from its supply roll into contact, and the composite then slit and the tapes wound into suitable rolls with the liner on the outside of the turns.

Adhesive Example 1

| | Parts by weight |
|---|---|
| Milled latex crepe | 250 |
| Ester gum (acid number of 2–10) | 175 |
| "Flectol B" (antioxidant) | 1.25 |
| Heptane (volatile solvent) | 1,550 |
| Alcohol (viscosity reducer) | 15.5–31 |

The raw latex crepe is milled for about 10 minutes, at a temperature of about 140–150° F., and is then cut into small pieces. The ester gum is dissolved in an equal amount of the solvent, and the "Flectol B" is likewise dissolved in a portion of the solvent. The balance of the solvent is placed in a suitable churn and the various ingredients added and churned until a homogeneous solution is obtained. The resulting adhesive solution is then ready for coating upon the primed cellulosic film, to form, upon evaporation of the solvent, a normally tacky and pressure-sensitive transparent adhesive coating of such high cohesive strength that internal yielding will not occur to cause adhesive offsetting, when the adhesive sheet is stripped from surfaces to which temporarily applied, such as glass, cellulosic films, and wood.

The alcohol is employed as a viscosity reducer to decrease the amount of solvent required to produce a solution of desired viscosity, and may be omitted with a compensatory increase of solvent. The alcohol may be denatured ethyl alcohol or may be methyl alcohol, for example. The "Flectol B" (a liquid condensation product of acetone and aniline) is a well known rubber antioxidant and may be substituted for by others, such as beta-naphthol and "Solux" (p-hydroxy-N-phenyl-morpholine).

A feature of the present primer is that it is not readily soluble in rubber solvents, and the adhesive composition may be applied without washing off or damaging the primer film.

As previously mentioned, a coloring pigment may be incorporated in the adhesive. This may be conveniently accomplished by milling the pigment into the rubber during the preliminary milling of the latter. Thus para-toluidine red may be added to give a red color, or gold bronzing powder to give a gold color. Zinc oxide may be incorporated if desired.

Various other tack-producing resins compatible with rubber, may be used in place of the specified ester gum, such as for example, wood or gum rosin, hydrogenated rosin or ester gum, and solid cycloparaffin resins. Plasticizers and softening agents may be included.

Adhesive Example 2

| | Parts |
|---|---|
| Rubbery isobutylene polymer resin (52,000 molecular weight) | 100 |
| Cycloparaffin resin of 145–150° C., melting point | 40 |
| Plasticizing agent such as methyl abietate or hydrogenated methyl abietate | 20 |
| Softener, such as butyl stearate | 10 |
| Heptane (volatile solvent) | 700 |

The above example illustrates a transparent hydrophobic water-insoluble pressure-sensitive adhesive which contains no rubber, but which bonds firmly to the primer because of compatibility with the latex or rubber phase of the primer.

These adhesives may be compounded without the solvent, by milling the ingredients together, and then calendered or frictioned upon the primed backing.

Adhesive Example 3

| | Parts |
|---|---|
| 1/2 sec. nitrocellulose | 25 |
| Dibutyl phthalate | 20 |
| "Acryloid No. C-10" (methyl methacrylate resin made by Resinous Products Co.) | 100 |
| "Methyl acetone" (solvent mixture composed of 48% acetone, 28% methyl acetate, 24% methyl alcohol) | 30 |

Adhesive Example 4

| | Parts |
|---|---|
| Latex crepe rubber | 2 |
| Gum rosin | 4 |
| "Flexo resin No. A-1" (oxidized, polymerized terpene made by Glyco Products Co.) | 3½ |
| Oleum spirits (petroleum hydrocarbon solvent of 306-424° F. boiling range) | 6 |

Adhesive Example 5

| | Parts |
|---|---|
| Ethyl cellulose (low viscosity standard ethoxy type) | 800 |
| "Opal Wax No. 10" (synthetic wax made by Du Pont Co.) | 400 |
| Stearic acid | 200 |
| Wood rosin | 200 |
| Oleum spirits | 2,040 |

The foregoing Examples 3, 4 and 5 represent adhesive compositions which may be applied to the primed cellulosic film to yield, upon evaporation of solvent vehicle, non-tacky coatings which are transparent, and which may be activated to adhesiveness by either solvents or heat. Transparent adhesive tape of this kind has utility for uses where a pressure-sensitive adhesive tape is not wanted.

With particular reference to the making of pressure-sensitive adhesive sheets and tapes, the following very advantageous features may be noted:

(a) An extremely strong bonding of the adhesive to regenerated cellulose films is secured. A quantitative measure of this can be obtained by using a testing machine provided with a screw driven platform. A length of the adhesive tape to be tested is secured to the platform with the adhesive face out. Another length of the tape is placed with its adhesive face in contact so that the two adhesive coatings cohere, being pressed firmly together with a roller. The end of the outer tape is drawn back at an angle of approximately 180° and is connected by a string to a device for measuring tension, such as a spring scale. The platform is then driven at a constant rate, with the result that the second tape is stripped off, carrying with it the adhesive coating of the tape being tested. If the anchorage of the adhesive to the primer (when present) is greater than the anchorage of the primer to the tape backing, the primer will also be stripped off. The tension on the second tape is measured and indicates the stripping force required, and thus measures the strength of bond by which the adhesive coating is held. Comparisons can be made between different primers and between the bonding strengths with primer and without primer. In the case of tape made by directly applying the pressure-sensitive adhesive of "Adhesive Example 1" to a regenerated cellulose film, with no interposed primer, a stripping force of 20 ounces per inch width of tape was measured, with the platform moving at a constant rate of 7.5 feet per minute. In the case of adhesive tapes having an interposed casein-latex primer film, made as hereinbefore described of the example, and with the casein-latex formula of the example, but otherwise identical, the stripping forces have fallen within the range of 52 to 72 ounces, depending upon variations in the precise priming procedure. Thus the casein-latex primer has increased the bonding strength by which the adhesive is held to the backing, by a factor 2½ to 3½ times, compared with the bond strength when no primer is used. In these tests of primed tape, the adhesive coating was pulled from the primer, showing that the bond between primer and cellulose backing was even higher. An even greater ratio exists when the primer has been tanned with formaldehyde in any of the ways hereinbefore described, particularly when comparison is made between adhesive tapes which have been subjected to moisture or very humid atmospheres. Tanning increases the strength of bond between adhesive and primer to an extent such that the adhesive coating splits in making the tests, rather than being pulled from the primer. To illustrate the utility of dextrin, a primer composition was made in accordance with the example but using dextrin in place of casein (approximately 50 parts dextrin per 100 parts rubber solids). Regenerated cellulose primed with this and then coated with the pressure-sensitive adhesive, when tested, showed a stripping force of 40 ounces per inch width, as compared with 20 when no primer was used.

(b) The primer has an excellent aging life, retaining its cohesiveness and adhesiveness for longer than previously used primers. The primer is very firm and cohesive, since there has been no degradation of the rubber content.

(c) The pressure-sensitive adhesive coating is not deteriorated more rapidly than when no primer is used. In contrast, previously used primers made by fluxing reclaim rubber with rosin (the reclaim rubber being used to secure a higher cohesiveness than could be obtained with raw rubber in this type of primer) caused aging of the rubber-resin adhesive, probably due to the fact that reclaim rubber is necessarily old and contains peroxides which migrate to the adhesive layer and catalyze oxidation of the rubber therein. In this connection it may be noted that the present primer holds the adhesive to the backing more firmly than said reclaim rubber-rosin type.

(d) The primer contains no resin to wash out when coated with adhesive in a rubber solvent vehicle, and the dried primer film is not harmed.

(e) The primer is very inexpensive and the method of application is simple and inexpensive. Drying can take place in an open room without fire hazard.

What I claim is as follows, including such range of equivalents as the nature of the invention and the prior art permits:

1. A sheet material including a non-fibrous hydrophilic cellulosic film having a smooth, dense, non-porous surface thereof to which is united a contacting film formed of the dried deposition product of an aqueous emulsion of latex and hydrophilic colloidal agglutinant, the proportion of colloidal agglutinant being about 15 to 600 parts by weight per 100 parts of latex rubber solids.

2. A flexible sheet material comprising a backing of a non-fibrous hydrophilic cellulosic film having a smooth, dense, non-porous surface thereof to which is united a contacting film having a thickness of less than 0.5 mils and formed of the dried deposition product of an aqueous emulsion of latex and casein, the proportion of latex being about 15 to 600 parts by weight per 100 parts of latex rubber solids.

3. A non-fibrous flexible film of regenerated cellulose containing a hygroscopic water-soluble softening agent and having a smooth, dense, non-porous surface thereof to which is united a contacting film formed of the dried deposition product of an aqueous emulsion of latex and hydrophilic colloidal agglutinant, the proportion of colloidal agglutinant being about 15 to 600 parts by weight per 100 parts of latex rubber solids.

4. A sheet material including a non-fibrous hydrophilic cellulosic film having a smooth, dense, non-porous surface thereof to which is united a contacting film formed of the dried deposition product of an aqueous emulsion of latex and hydrophilic protein glue which has been tanned in situ, the proportion of colloidal agglutinant being about 15 to 600 parts by weight per 100 parts of latex solids.

5. A flexible sheet material comprising a regenerated cellulose film containing a hygroscopic water-soluble softening agent and having a smooth, dense, non-porous surface thereof to which is united a contacting film formed of the dried deposition product of an aqueous emulsion of latex and casein, having a thickness of less than 0.5 mil, the proportion of casein being of the order of 50 parts by weight per 100 parts of latex rubber solids, and said casein being formaldehyde-tanned in situ, the casein-latex film being firmly bonded to provide a water-resistant flexible coating which remains bonded upon bending, creasing and flexing of the sheet material.

6. A sheet material comprising a non-fibrous hydrophilic cellulosic film having a smooth, dense, non-porous surface thereof, a primer film contacting said surface and formed of the dried deposition product of an aqueous emulsion of latex and hydrophilic colloidal agglutinant, the proportion of colloidal agglutinant being about 15 to 600 parts by weight per 100 parts of latex rubber solids, and a water-insoluble hydrophobic coating compatible with and united to said primer film, said coating being bonded more firmly than it would be if the primer film were omitted.

7. A transparent sheet material comprising a non-fibrous hydrophilic cellulosic film having a smooth, dense, non-porous surface thereof, a primer film contacting said surface and formed of the dried deposition product of an aqueous emulsion of latex and hydrophilic protein glue, the proportion of protein glue being about 15 to 600 parts by weight per 100 parts of latex rubber solids, and a transparent coating united to said primer film and including a substantial proportion of material compatible with the rubber of the primer film, said coating being bonded more firmly than it would be if the primer film were omitted.

8. A flexible adhesive sheet material comprising a flexible film of regenerated cellulose containing a hygroscopic water-soluble softening agent and having a smooth, dense, non-porous surface thereof to which is united a primer film formed of the dried deposition product of an aqueous emulsion of latex and hydrophilic colloidal agglutinant which adheres strongly to cellulose, the proportion of colloidal agglutinant being about 15 to 600 parts by weight per 100 parts of latex rubber solids, and a water-insoluble hydrophobic adhesive coating compatible with said primer and united thereo so as to be bonded more firmly than if said primer were omitted.

9. A sheet material including a non-fibrous hydrophilic cellulosic film having a smooth, dense, non-porous surface thereof to which is united a contacting primer film formed of the dried deposition product of an aqueous emulsion of latex and hydrophilic protein glue which has been tanned in situ, the proportion of protein glue being about 15 to 600 parts by weight per 100 parts of latex rubber solids, and a water-insoluble hydrophobic coating compatible with and united to said primer film, said coating being bonded more firmly than it would be if the primer film were omitted.

10. A flexible adhesive sheet material comprising a flexible film of regenerated cellulose containing a hygroscopic water-soluble softening agent and having a smooth, dense, non-porous surface thereof, a primer film united to said surface and having a thickness of less than 0.5 mils formed of the dried deposition product of an aqueous emulsion of latex and casein, the casein being formaldehyde-tanned in situ and present in a proportion of the order of 50 parts by weight per 100 parts of latex rubber solids, and a coating of water-insoluble hydrophobic adhesive compatible with and united to said primer film, said coating being bonded more firmly than it would be if the primer film were omitted.

11. A pressure-sensitive adhesive sheet comprising a non-fibrous flexible hydrophilic cellulosic film backing having a smooth, dense, non-porous surface thereof to which is united a contacting primer film formed of the dried deposition product of an aqueous emulsion of latex and hydrophilic colloidal agglutinant, the proportion of colloidal agglutinant being about 15 to 600 parts by weight per 100 parts of latex rubber solids, and a water-insoluble pressure-sensitive adhesive coating compatible with and united to said primer film so as to be bonded more firmly than it would be if said primer film were omitted.

12. A pressure-sensitive adhesive sheet comprising a non-fibrous hydrophilic cellulosic film backing having a smooth, dense, non-porous surface thereof to which is united a contacting primer film formed of the dried deposition product of an aqueous emulsion of latex and hydrophilic protein glue, the glue being tanned in situ and present in proportion of about 15 to 600 parts by weight per 100 parts of latex rubber solids, and a water-insoluble pressure-sensitive adhesive coating compatible with and united to said primer film so as to be bonded more firmly than it would be if said primer film were omitted.

13. An adhesive sheet comprising a non-fibrous flexible regenerated cellulose film backing having a smooth, dense, non-porous surface thereof, a primer film contacting and united to said surface and formed of the dried deposition product of an aqueous emulsion of latex and hydrophilic colloidal agglutinant, the proportion of colloidal agglutinant being about 15 to 600 parts by weight per 100 parts of rubber solids, a water-insoluble normally tacky and pressure-sensitive flexible adhesive coating compatible with and united to said primer film so as to be bonded more firmly than if said primer were omitted, and being so highly cohesive that the adhesive sheet may be unwound from rolls thereof without delamination or offsetting of adhesive, said adhesive sheet transmitting light so that the sheet will not conceal the coloring or markings of surfaces to which applied.

14. A double-coated pressure-sensitive adhesive sheet comprising a non-fibrous hydrophilic cellulosic film backing having smooth, dense, non-porous surfaces thereof, primer films contacting and united to each face of said film backing and formed of the dried deposition product of an aqueous emulsion of latex and hydrophilic colloidal agglutinant, the proportion of colloidal agglutinant being about 15 to 600 parts by weight per 100 parts of rubber solids, and water-insoluble normally tacky and pressure-sensitive non-offsetting adhesive coatings compatible with and united to each of said primer films and bonded more firmly to the backing than if said primer films were omitted.

15. A pressure-sensitive adhesive tape comprising a non-fibrous regenerated cellulose film backing, a water-insoluble normally tacky and pressure-sensitive non-offsetting rubber-resin adhesive coating, an interposed primer film contacting and united to both the cellulose film and the adhesive coating, having a thickness of less than 0.5 mils and formed of the dried deposition product of an aqueous emulsion of latex and hydrophilic colloidal agglutinant proportioned so that the tacky adhesive coating is bonded to the cellulose film backing at least about twice as firmly as it would be if said primer were omitted, the proportion of colloidal agglutinant being within the range of 15 to 600 parts by weight per 100 parts of the latex rubber solids, said adhesive tape being unwindable from rolls thereof without delamination or offsetting of adhesive and transmitting light so as not to conceal the coloring or markings of surfaces to which applied.

16. A transparent pressure-sensitive adhesive tape resistant to the effect of humid atmospheres, comprised of a non-fibrous regenerated cellulose film backing containing a hygroscopic water-soluble softening agent, a water-insoluble normally tacky and pressure-sensitive non-offsetting rubber-resin adhesive coating, and an interposed primer film contacting and united to both the primer film and the adhesive coating and having a thickness of less than 0.5 mils and formed of the dried deposition product of an aqueous emulsion of latex and casein, the casein being formaldehyde-tanned in situ, and the proportion of casein to latex being within the range of 15 to 600 parts by weight of casein per 100 parts of the latex rubber solids, such that the tacky adhesive coating is bonded to the backing at least about twice as firmly as it would be if said primer film were omitted.

17. A transparent double-coated pressure-sensitive adhesive sheet comprised of a non-fibrous regenerated cellulose film backing having united to each face a primer film comprised of the dried deposition product of an aqueous emulsion of latex and casein, and a water-insoluble normally tacky and pressure-sensitive non-offsetting rubber-resin adhesive coating united to each primer film, the proportion of casein to latex in each primer film being within the range of 15 to 600 parts by weight of casein per 100 parts of the latex rubber solids, such that the overlying tacky adhesive coating is bonded to the backing at least about twice as firmly as it would be if said primer film were omitted, said adhesive sheet permitting the application of a regenerated cellulose film liner to an adhesive face with subsequent stripping away of the liner without pulling the adhesive from its backing.

RICHARD GURLEY DREW.